May 8, 1956  F. M. ROBEY  2,744,701
TETRAHEDRONAL KITE AND METHOD OF MAKING SAME
Filed Jan. 29, 1953
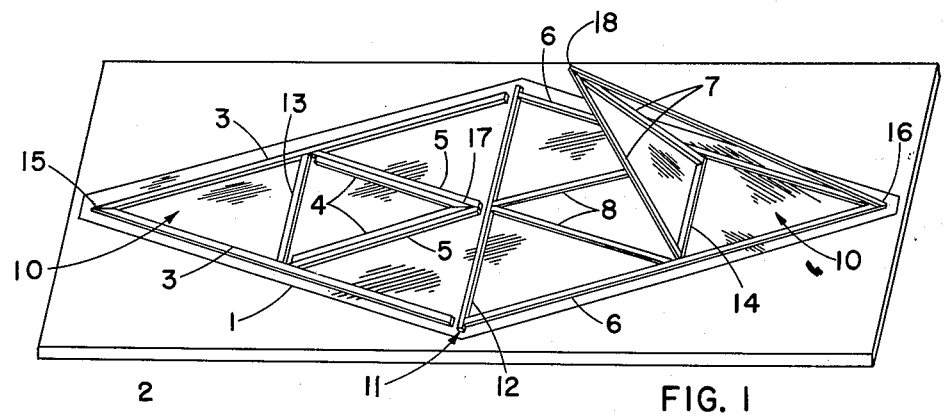
FIG. 1
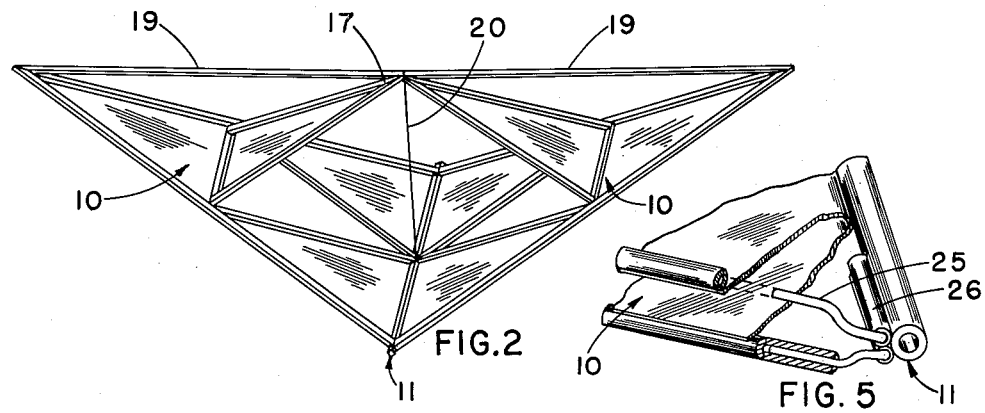
FIG. 2
FIG. 5
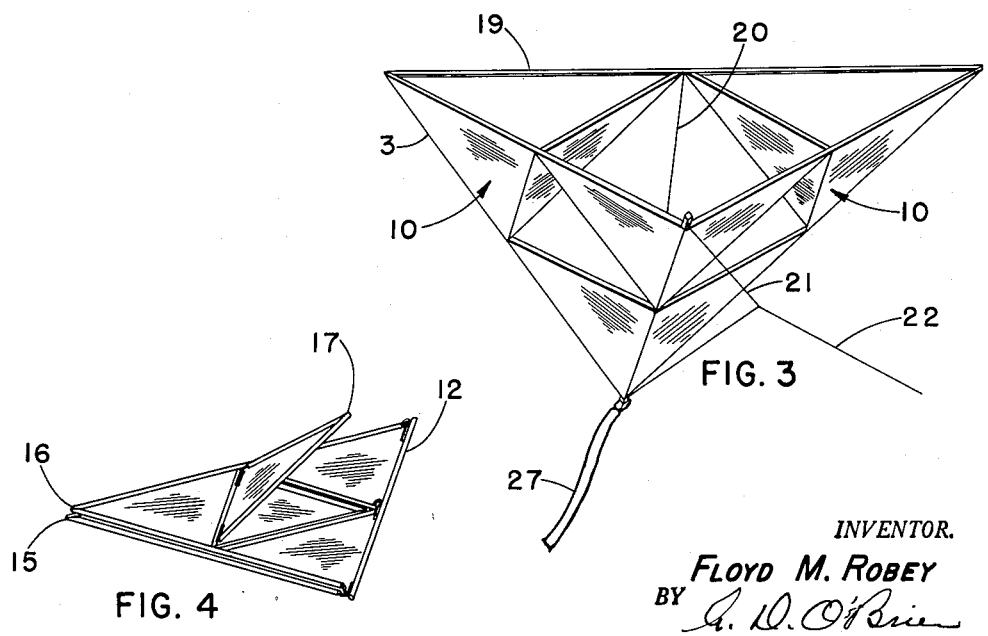
FIG. 3
FIG. 4
INVENTOR.
*Floyd M. Robey*
BY

United States Patent Office 2,744,701
Patented May 8, 1956

2,744,701

TETRAHEDRONAL KITE AND METHOD OF MAKING SAME

Floyd M. Robey, Indianapolis, Ind.

Application January 29, 1953, Serial No. 334,106

2 Claims. (Cl. 244—153)

(Granted under Title 35, U. S. Code (1952), sec. 266)

The invention described herein may be manufactured and used by or for the Government of the United States of America for governmental purposes without the payment of any royalties thereon or therefor.

My invention relates to kites, and is particularly directed to improvements in construction for increasing rigidity of the kite framework, for decreasing weight, and for simplifying assembly of the framework.

The aerodynamic surfaces of box-type kites and tetrahedronal kites have heretofore been made by tightening a membrane over a wire or wood frame and then assembling the various frames into the desired three dimensional configurations. Such kites are tedious to make, cannot be easily dismantled, are expensive, and are generally structurally weak. Because the frames are separately made and assembled the aerodynamic surfaces are not always uniform in size and pitch angle and do not have the maximum lift in a given wind velocity. For military and meterological uses, as well as for toys, the kites should be easy to knock down for shipping.

An object of my invention is an improved kite.

A more specific object of my invention is a kite that is structurally strong for a given weight.

Another object of my invention is a kite that can be packaged and shipped in a minimum of space and yet can be quickly readied for flight.

A still more specific object of my invention is a kite which has aerodynamic surfaces that can be accurately and efficiently reproduced in manufacture.

Other objects of my invention will become evident from the following description of one embodiment of my invention, which embodiment is illustrated in the accompanying drawings where Fig. 1 is a perspective view of a partially assembled kite of my invention, Fig. 2 is a perspective rear view of a completely assembled kite of my invention, Fig. 3 shows in perspective frontal view, a kite in flight of my invention, Fig. 4 shows, in perspective, a kite unit of my invention folded and ready for shipment, and Fig. 5 is a detail view of a hinge structure of my kite.

My novel kite is fabricated of a plurality of triangular aerodynamic surfaces, the surfaces being pyramided into a symmetrical tetrahedronal object. The triangles are preferably symmetrical isosceles triangles, although equilateral triangles may be used. According to an important feature of my invention all of the triangular surfaces are laid out on a plane table 2, Fig. 1, outline of each surface being precisely geometrically defined on the plane surface as by a template, pattern or jig. It is found that the plane surface layout method insures in manuafacture a uniformity of the aerodynamic surfaces heretofore not possible and results in a kite that has unusual stability and lift.

Referring to Fig. 1 a sheet of membrane 1, such as commercially obtainable parchment paper, plain paper, or thin gage thermoplastic sheeting is laid out on the plane table 2. A set of ribs or stays 3, 4, 5, 6, 7, 8, pre-cut to length, are then laid on the membrane and positioned to form the triangles, and are then secured to the membrane, as by gluing or stapling. The stays may conveniently comprise thin strips of balsa wood or wire, and may be positioned according to a pattern printed on the membrane or on the table if the membrane is transparent. Templates, jigs and guides may of course be used as manufacturing technique may dictate. After the stays have been secured to the membrane a sharp-edged trimming tool is used to trim the membrane from around the outer edges of the sheet and to slit the membrane along the sides of the various triangular panels within the boundaries of the kite. That is, the membrane is cut between stays 4 and 5 and between stays 7 and 8, in Fig. 1. In the specific embodiment illustrated in Fig. 1 the two principal or major triangular frames 10, outlined by stays 3—3 and 6—6, are hingedly joined along their common base line 11 of the frames and may be flexed about the stay 12 along the base line.

Hinge rods 13 and 14 are positioned parallel to the base line 11 in each frame and joined to the side stays 3—3 and 6—6 of the triangular frames intermediate the ends of the side edges of the triangular frames. The hinge rods, like the base line stay, provide a hinge about which the minor triangular frames or panels may be swung. The membrane between the stays 4 and 5, and between stays 7 and 8 are cut by a razor blade or similar tool after the stays are fastened to the membrane. The finished plane table assembly may be folded back upon itself as suggested in Fig. 5 for packaging and shipping.

To prepare for flight, the frames 10 are swung about their base line 11, as suggested in Fig. 2, and the stays 4 and 7 are flexed upwardly to bring the apexes 15 and 16 of the frames and apexes 17 and 18 of the panels into substantial alignment. This produces a stretching effect substantially uniformly in the membrane 1 since the membrane is not fastened to the stay 12 or the hinge rods 13 and 14. The brace bar 19 is attached to the points of the frames and panels. Brace bar 19 may comprise a single member or two members of equal length. Attachment may be made by glue, or by demountable fastening details, depending on whether the kite must be collapsed after flight. A tension brace string 20 may be added between the center of the base line and the apexes 17 and 18. A string hitch 21 tied with a slip knot to the flying line 22 provides a convenient means of adjusting the pitch of the kite in the wind.

It will be perceived that the frame and panel stays of my kite may be made of tubes or wires of suitable stiffness and that the hinge joints may be made detachable. In Fig. 5, for example, I propose a hinge structure that will permit a full swing of the panels from the folded shipping position to the open flight position. Yet, the hinge will not kink or over stretch the membrane, and is easily detachable. Stays of aluminum tubing are particularly adaptable to this hinge. Wires 25 are sweated or welded in the end of one tubular stay, the other end of the wire being bent to slip into the socket 26 at the adjacent end of the other stay. By assembling the kite of variously colored panels it is easily adapted for semaphore and signaling purposes. A weight or tail structure 27 is attached to the lower corner of the kite as shown in Fig. 3 for stabilizing the kite in flight.

Many modifications in the structural details of my invention may be made without departing from the scope of the invention.

I claim:

1. The method of producing a tetrahedronal-type kite comprising; placing a single sheet of membrane on a plane working surface; placing pre-cut ribs on said membrane to form a pair of relatively large triangles having a common hinged base; placing smaller lengths of precut ribs on said membrane to form inverted triangular frames within each said relative large triangles; hingedly connecting said smaller lengths of pre-cut ribs to said pre-cut ribs forming said relatively large triangles; cutting said single sheet of membrane around said inverted triangles from the apexes thereof to the bases thereof; fastening said membrane to said ribs, whereby to form hingedly interconnected triangular panels; hingedly displacing said panels about their bases so as to dispose said panels in noncoplanar relation with their apexes on a common line; and attaching a brace bar to said apex.

2. A tetrahedronal-type kite comprising a first pair of triangular frames having rigid sides hingedly joined along a common base; a second pair of triangular frames smaller than said first pair, one triangular frame of said second pair being hingedly joined to the rigid sides of one of said first pair of triangular frames and the other triangular frame of said second pair being hingedly joined to the rigid sides of the other triangular frame of said first pair; a single membrane secured to each of said triangular frames thereby forming a plurality of aerodynamic surfaces; and a brace bar joined to the apexes of each said triangular frames.

References Cited in the file of this patent
UNITED STATES PATENTS

| | | |
|---|---|---|
| 770,626 | Bell | Sept. 20, 1904 |
| 856,838 | Bell et al. | June 11, 1907 |
| 997,455 | Lischtiak | July 11, 1911 |
| 2,520,704 | Wisney | Aug. 29, 1950 |